United States Patent
Kummetz

(10) Patent No.: US 10,374,640 B2
(45) Date of Patent: Aug. 6, 2019

(54) COMBINING RADIO FREQUENCY BANDS FOR INCREASING BANDWIDTH IN A WIRELESS COMMUNICATION SYSTEM

(71) Applicant: CommScope Technologies LLC, Hickory, NC (US)

(72) Inventor: Thomas Kummetz, Kissing (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/117,815

(22) PCT Filed: Feb. 10, 2015

(86) PCT No.: PCT/US2015/015111
§ 371 (c)(1),
(2) Date: Aug. 10, 2016

(87) PCT Pub. No.: WO2015/120423
PCT Pub. Date: Aug. 13, 2015

(65) Prior Publication Data
US 2017/0012649 A1    Jan. 12, 2017

Related U.S. Application Data

(60) Provisional application No. 61/937,814, filed on Feb. 10, 2014.

(51) Int. Cl.
*H04L 27/10* (2006.01)
*H04L 27/38* (2006.01)
(Continued)

(52) U.S. Cl.
CPC ............. *H04B 1/005* (2013.01); *H04B 7/022* (2013.01)

(58) Field of Classification Search
CPC .......... H04B 1/005; H04B 7/022; H04B 1/00; H04B 7/02; H04B 1/0483; H04K 1/10;
(Continued)

(56) References Cited

U.S. PATENT DOCUMENTS

| 5,894,473 A * | 4/1999 | Dent | H04B 7/2618 |
| | | | 370/320 |
| 7,260,159 B2 * | 8/2007 | Lee | H04L 27/3488 |
| | | | 375/261 |

(Continued)

FOREIGN PATENT DOCUMENTS

WO    2013033199    3/2013

OTHER PUBLICATIONS

International Search Authority, "International Search Report and Written Opinion for PCT/US2015/015111", dated Apr. 28, 2015, pp. 1-11, Published in: US.
(Continued)

*Primary Examiner* — Pablo N Tran
(74) *Attorney, Agent, or Firm* — Fogg & Powers LLC

(57) ABSTRACT

A frequency offset device can be located at a remote unit of a distributed antenna system and can be configured to combine two or more RF bands to allow the remote unit to process signals otherwise associated with a total RF bandwidth beyond the capabilities of the remote unit to process simultaneously. Signals of the RF bands are received at the unit. At least one of the RF bands is shifted to form a composite RF band that has an edge of a first RF band overlapping an edge of a second RF band. The composite RF band includes information from the signals of the first RF band and from the signals of the second RF band. The remote unit can process the composite RF band.

19 Claims, 5 Drawing Sheets

(51) Int. Cl.
*H04B 1/00* (2006.01)
*H04B 7/022* (2017.01)

(58) Field of Classification Search
CPC ......... H04L 27/28; H04L 27/10; H04L 27/36; H04L 27/38
See application file for complete search history.

(56) References Cited

U.S. PATENT DOCUMENTS

| | | | | |
|---|---|---|---|---|
| 8,055,234 | B2* | 11/2011 | Mattisson | H04B 1/109 |
| | | | | 455/137 |
| 9,565,596 | B2* | 2/2017 | Watkins | H04W 28/20 |
| 2004/0022229 | A1* | 2/2004 | Vanness | H04L 1/0036 |
| | | | | 370/343 |
| 2007/0183310 | A1* | 8/2007 | Nakamura | H04L 5/0016 |
| | | | | 370/208 |
| 2009/0052556 | A1* | 2/2009 | Fernandez | H03M 1/662 |
| | | | | 375/241 |
| 2011/2016810 | | 9/2011 | Kumar | |
| 2012/0002703 | A1 | 1/2012 | Yamashita et al. | |
| 2012/0321314 | A1 | 12/2012 | Oren et al. | |
| 2013/0236180 | A1 | 9/2013 | Kim et al. | |
| 2014/0024329 | A1 | 1/2014 | Khlat | |

OTHER PUBLICATIONS

European Patent Office, "Extended European Search Report from EP Application No. 15745774.8 dated Sep. 19, 2017", "from Foreign Counterpart of U.S. Appl. No. 15/117,815", filed Sep. 19, 2017, pp. 19, Published in: EP.

European Patent Office, "Communication pursuant to Article 94(3) from EP Application No. 15745774.8 dated Feb. 12, 2019", from Foreign Counterpart to U.S. Appl. No. 15/117,815, Feb. 12, 2019, pp. 1-4, Published: EP.

* cited by examiner

COMBINING RADIO FREQUENCY BANDS FOR INCREASING BANDWIDTH IN A WIRELESS COMMUNICATION SYSTEM

CROSS-REFERENCE TO RELATED APPLICATION

This application is a U.S. National Stage application of PCT Application Serial No. PCT/US2015/015111, filed Feb. 10, 2015 and titled "COMBINING RADIO FREQUENCY BANDS FOR INCREASING BANDWIDTH IN A WIRELESS COMMUNICATION SYSTEM," which claims the benefit of U.S. Provisional Application Ser. No. 61/937,814, filed Feb. 10, 2014 and titled "COMBINING RF BANDS IN RF BANDWIDTH FOR A WIRELESS COMMUNICATION SYSTEM," the contents of all of which are incorporated herein by reference.

TECHNICAL FIELD

The present disclosure relates generally to wireless communication systems (e.g., a distributed antenna system) and, particularly but not necessarily exclusively, to signal processing in combining radio frequency (RF) bands.

BACKGROUND

A distributed antenna system ("DAS") may extend the coverage of a telecommunications system by communicating signals between one or more base transceiver stations of a cellular communications network and one or more remote units. The remote units can wirelessly communicate with mobile devices located in the coverage area.

A remote unit can be limited to communicating signals having a maximum bandwidth. The maximum bandwidth for a remote unit can be based on physical characteristics of the antenna in the remote unit or the communicated signal. A typical bandwidth limitation for a remote unit is 75 MHz. In some circumstances, however, greater bandwidth is desirable for remote units.

One method for increasing the bandwidth available to remote units includes combining the bandwidth of different RF bands into a combined or composite RF band. The combined RF band can be created by overlapping a portion of two or more bands. One problem, however, associated with conventional methods for combining bands is that interference, group delay, and other ripple effects associated with overlapping the bands can negatively impact the communications performance of signals using the combined band. Ripple can include, for example, an amplitude, gain, or group delay variation, noise associated with summing noise of multiple signals, or local oscillator leakage that can arise when combining RF bands.

Accordingly, it is desirable to increase the bandwidth available to remote units in a wireless communication system, such as a DAS, without the negative ripple effects associated with combining multiple RF bands.

SUMMARY

In one example, signals of a first RF band and signals of a second RF band are received at a remote unit of a distributed antenna system. The first RF band is positioned in frequency to form a composite RF band. The composite RF band has an edge of the first RF band overlapping an edge of the second RF band. The composite RF band includes information from the signals of the first RF band and from the signals of the second RF band. The composite RF band is processed at the remote unit.

The details of one or more aspects and examples are set forth in the accompanying drawings and the description below. Other features and aspects will become apparent from the description, the drawings, and the claims.

DETAILED DESCRIPTION

The present disclosure includes methods and systems for combining RF bands to increase, effectively, RF bandwidth for a wireless communication system and determining an amount of offset for the overlapping RF bands when combined. For example, a frequency offset device can be located at a remote unit of a distributed antenna system ("DAS") and can be configured to combine two or more RF bands to allow the remote unit to process signals otherwise associated with a total RF bandwidth beyond the capabilities of the remote unit to process simultaneously.

According to one example, a signal of one RF band and another signal of another RF band can be received by the remote unit and provided to the frequency offset device. At least one of the RF bands can be positioned in frequency with respect to the other band to form a composite RF band. The bandwidth of the composite RF band can be greater than the bandwidth of either of the RF bands separately and even slightly wider than the total bandwidth of both bands. The composite RF band can be formed by overlapping a signal edge of one RF band with a signal edge of the other RF band. For example, one of the RF bands can be positioned in frequency such that an upper edge of the band coincides (or otherwise overlaps) with the lower edge of the other RF band. The signals can be positioned correspondingly to the positioning of the RF bands and form a composite signal. The composite signal can be processed using the composite RF band, which can result in enhanced communications performance.

An RF band can be offset by an offset amount that is selected to minimize ripple associated with overlapping the RF bands. Ripple can negatively impact the communications performance (e.g., speed, error rate) of the composite signal in the overlapping frequency band ("overlap zone"). The offset can be selected to eliminate, minimize, or otherwise reduce the amount of ripple associated with the composite RF band.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

Figure 1:
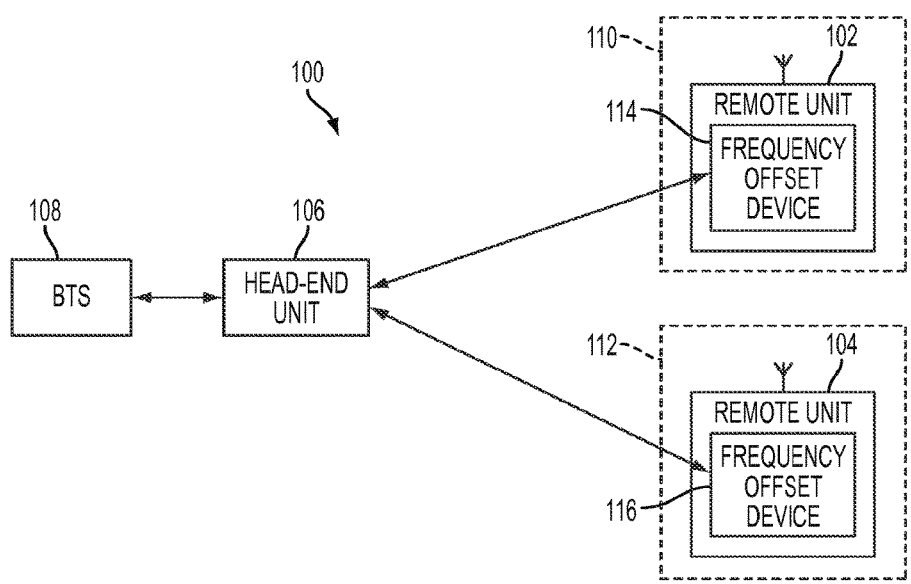
FIG. 1 is a block diagram depicting an example of base station and a distributed antenna system for combining RF bands according to one aspect of the present disclosure.

FIG. 1 depicts an example of a DAS 100 suitable for performing bandwidth combining according to some aspects. The DAS 100 can include a network of spatially separated remote units 102, 104 communicatively coupled to a head-end unit 106, which can be a common source, via a transport medium to provide wireless service within coverage zones 110, 112, which may be a geographic area or structure, such as a building. For example, the DAS 100 can communicate signals between a base transceiver station ("BTS") 108 and mobile user equipment communication devices (not shown) via, for example, the head-end unit 106 and the remote units 102, 104.

The head-end unit 106 can transceive uplink signals and downlink signals with the BTS 108. Any suitable communication link can be used for communication between the BTS 108 and the head-end unit 106. Examples of communication links include a direct connection or a wireless connection. A direct connection can include, for example, a connection via a copper, optical fiber, or other suitable communication medium. In some aspects, the head-end unit 106 can be connected to remote units 102, 104 via one or more extension units or other intermediate devices.

Remote units 102, 104 can provide signal coverage in the coverage zones 110, 112, respectively, by transmitting downlink signals to mobile communication devices in the coverage zones 110, 112 and by receiving uplink signals from the mobile user equipment devices in the coverage zones 110, 112. The remote units 102, 104 can transmit uplink signals to the head-end unit 106. The head-end unit 106 can combine the uplink signals received from the remote units 102, 104 for transmission to the BTS 108. Information can be transmitted between the head-end unit 106 and the remote units 102, 104 in any format, such as in analog or digital form. Only two remote units 102, 104 are shown in FIG. 1, but a DAS according to various aspects can include any number of remote units, including one. In some implementations, the remote units 102, 104 include frequency-agnostic radios for transceiving signals at various frequencies within the RF spectrum and being capable of transceiving signals at frequencies that may be used subsequent to installation.

The remote units 102, 104 include frequency offset devices 114, 116 for performing bandwidth combining. In other implementations, the frequency offset devices 114, 116 are separate, but communicatively coupled to, the remote units 102, 104 instead of being within the remote units 102, 104. Signals received by the remote units 102, 104 can be provided to the frequency offset devices 114, 116 for determining an offset amount of one or more RF bands. For example, the remote unit 102 can receive a first signal associated with a first RF band and a second signal associated with a second RF band. The remote unit 102 can provide the received signals to the frequency offset device 114. The frequency offset device 114 can shift the first RF band, the second RF band, or both, to form a composite RF band. The composite RF band can include a combination of the first RF band and the second RF band by overlapping at least a portion of the first RF band with a portion of the second RF band. For example, the frequency of the first RF band can be positioned in frequency such that a leading edge of the first RF band overlaps a trailing edge of the second RF band. The composite RF band can include signals with information from the first signal of the first RF band and the second signal of the second RF band. The composite RF band can have a bandwidth that is less or slightly wider (bandwidth of plateau of the first RF band plus the bandwidth of the plateau of the second RF band plus the edge offset 306) than the total bandwidth of both RF bands prior to being offset. The signals in the composite band can be processed by the remote unit 102.

The amount of shift performed by the frequency offset devices 114, 116 can be an offset of a frequency shift that is less than a maximum frequency shift. The maximum frequency shift includes the amount of shift associated with overlapping the first RF band and the second RF band such that the end of the leading edge of the first RF band coincides with the beginning of the trailing edge of the second RF band (e.g., a zero edge offset). Overlapping the first and second RF bands with no edge offset can, however, be associated with an undesirable ripple effect that can negatively impact communication performance. The offset can include a minimum edge offset for which no ripple (or an acceptable amount of ripple) is created in the overlap zone to minimize the amount of ripple when overlapping RF bands.

Figure 2:
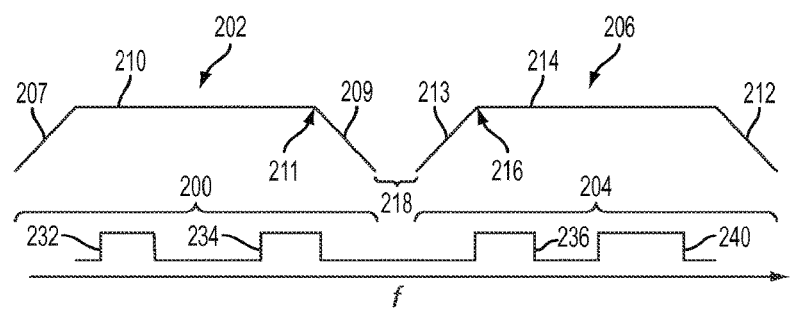
FIG. 2 is a signal diagram depicting a signal scenario in which there is no bandwidth combination according to one aspect of the present disclosure.

FIG. 2 is a signal diagram depicting a signal scenario in which no bandwidth combining has been performed according to one aspect of the present disclosure. A first signal 200 can be associated with a first RF band 202. A second signal 204 can be associated with a second RF band 206. The first RF band 202 can include a trailing edge 207, a leading edge 209, and a plateau 210. An inflection point 211 of the first RF band 202 can include a frequency at which the first RF band 202 transitions from the leading edge 209 to the plateau 210. Likewise, the second RF band 206 can include a leading edge 212, a trailing edge 213, and a plateau 214. An inflection point 216 of the second RF band 206 can include a frequency at which the second RF band 206 transitions from the plateau 214 to the trailing edge 213.

In FIG. 2, the first RF band 202 and the second RF band 206 have not been shifted and do not overlap, as indicated by gap 218 in frequency. The gap 218 can include a frequency range between the end of the first RF band 202 and the beginning of the second RF band 206. Thus, the gap 218 can include a portion of bandwidth for which the first and second RF bands 202, 206 do not overlap.

A signal edge can refer to a transition in a digital signal either from low value to a high value or from a high value to a low value. For example, the first RF band 202 includes a rising leading edge and a falling trailing edge. A leading edge can refer to an edge that precedes a plateau in time. A trailing edge can refer to an edge that follows a plateau in time. For example, the first RF band 202 can include a rising leading edge 212 and falling trailing edge 207. Similarly, the second RF band 206 can include a rising leading edge 209 and falling trailing edge 213.

Figure 3:
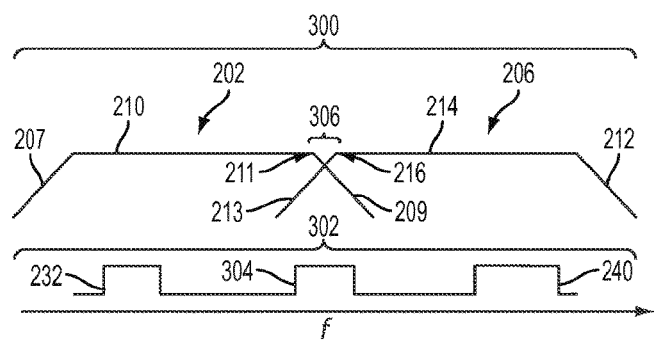
FIG. 3 is a signal diagram depicting the signal scenario shown in FIG. 2 after bandwidths of two RF bands are combined according to one aspect of the present disclosure.

FIG. 3, in contrast to FIG. 2, depicts a scenario in which at least a portion of one or both of the first RF band and the second RF band are positioned in frequency to overlap one another to create a composite RF band. According to one example, both the first RF band 202 and the second RF band 206 can be positioned in frequency. In other examples, only one RF band, first RF band 202 or second RF band 206, is shifted. The first RF band 202, the second RF band 206, or both can be shifted such that an edge of the first RF band 202 overlaps an edge of the second RF band 206. The overlapping portion can be bounded by the beginning of the leading edge 209 of the first RF band 202 and the end of the trailing edge 213 of the second RF band 206.

A small edge offset 306 may remain. The offset 306 can include the difference between the inflection points 211 and 216. The offset 306 can be determined to include the minimum offset for which no ripple (or an acceptable amount of ripple) is created as a result of the overlap. The edge offset 306 may be used for minimal ripple in the overlap zone.

Positioning of the first RF band 202 and the second RF band 206, and determining the offset 306, can be performed to limit or avoid gain or group delay variations in the overlapping zone.

The offset 306 can be determined at the time of design qualification or interactively on-site at an installation of a DAS. On-site calibration can include, for example, performing a scan using a continuous wave signal across the composite band 300 in the DAS 100. The continuous wave scan can include providing an internally generated continuous wave signal to each of the individual RF bands (e.g., first RF band 202 and second RF band 206. An uplink band can be centered in the overlap zone and used to receive signals associated with the scan. The detected information can be used to perform a flatness analysis.

According to another aspect, a wideband noise or quasi-noise signal can be used instead of a continuous wave signal.

The receive path can be calibrated by placing two received bands adjacent to each other and centering the transmit path on the overlap area of the received bands. The placement of the received bands can include an offset configured to eliminate, minimize, or reduce potential local oscillator leakage, which can negatively impact measurement accuracy.

In one example, a digital signal processor matching filter can be used to equalize amplitude and a group delay ripple associated with combining the first RF band 202 and the second RF band 206. For example, in an uplink path, the digital signal processor filter can cut-off any signal other than a predetermined band. Cutting off signals outside of the predetermined band can reduce or avoid summing noise for signals in the overlap zone.

In FIG. 3, the signal components 232, 240 are the same as the signal components 232, 240 in FIG. 2, but shifted. The composite signal 304 can include a combination of signal components 234, 236.

The signal 304 in FIG. 3 can as well be a signal that is positioned in the overlay zone. To achieve this, signal 304 is sent on the first RF band and at the same amplitude as for the first RF band on the second RF band with a frequency offset of $f_{offset,304} = -f_{BW210} - f_{BW,306}$ where $f_{BW210}$ is the bandwidth of the plateau 210 of first RF band, where $f_{BW,306}$ is the frequency bandwidth representing the edge offset 306. For the composite band, the signal 304 can be a composite signal generated out of the addition of the part from RF band 1 and the second part from RF band 2. For the composite signal 304 representing the originally sent signal 304, the composite RF band can be optimized for lowest amplitude, phase, and group delay ripple in the overlap zone.

Figure 4:
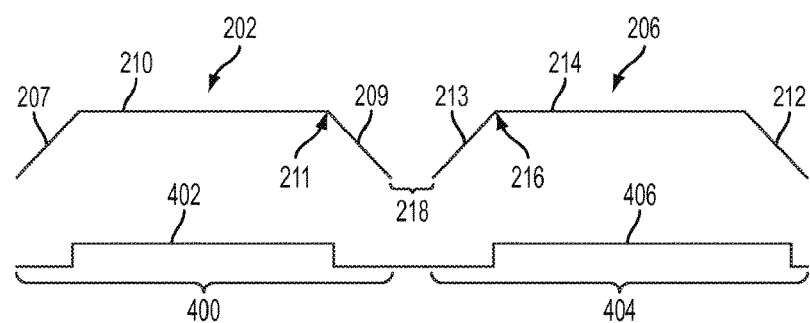
FIG. 4 is a signal diagram depicting a signal scenario without any bandwidth combination according to one aspect of the present disclosure.

FIG. 4 is a diagram depicting a signal scenario in which no bandwidth combining has been performed according to one aspect of the present disclosure. A first signal 400 can be associated with the first RF band 202. A second signal 404 can be associated with the second RF band 206. The first RF band 202 can include a trailing edge 207, a leading edge 209, and a plateau 210. The inflection point 211 of the first RF band 202 can include a frequency at which the first RF band 202 transitions from the leading edge 209 to the plateau 210. The second RF band 206 can similarly include a leading edge 212, a trailing edge 213, and a plateau 214. The inflection point 216 of the second RF band 206 can include a frequency at which the second RF band 206 transitions from the plateau 214 to the trailing edge 213.

In FIG. 4, the first RF band 202 and the second RF band 206 are unshifted and, thus, do not overlap. The first RF band 202 and the second RF band 206 can be separated by gap 218. The gap 218 can be located between the end of the first RF band 202 and the beginning of the second RF band 206 and can include an amount of the frequency band for which the first and second RF bands 202, 206 do not overlap.

Unlike FIG. 3, however, no signal components in FIG. 4 are located in the overlap zone. For example, the first signal 400 and the second signal 404 can be separated by the difference between inflection point 216 and inflection point 211. As will be described below with respect to FIG. 5, the first and the signal components 402, 406 can form a composite signal which includes the sum of the signal components 402, 406 when combined.

Figure 5:
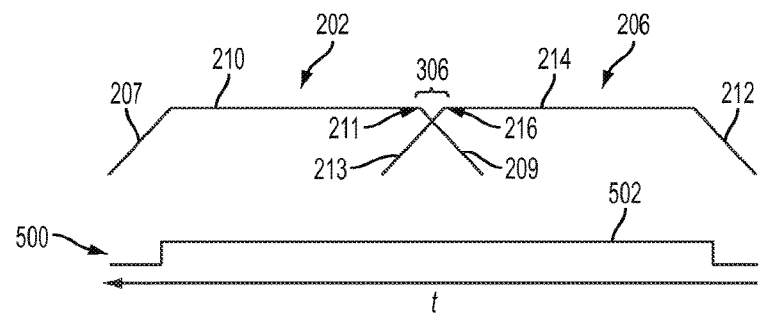
FIG. 5 is a signal diagram depicting the signal scenario shown in FIG. 4 after bandwidths of two RF bands are combined according to one aspect of the present disclosure.

FIG. 5 depicts a scenario in which at least a portion of the first and second RF bands 202, 206 are shifted to overlap one another to form a composite RF band 504. Referring to FIG. 5, the first and second RF bands 202, 206 can be shifted such that a leading edge 209 of the first RF band 202 overlaps a trailing edge 213 of the second RF band 206. In other examples, a single RF band can be shifted while other RF bands remain un-shifted to create the composite RF band 302. For example, the first RF band 202 can be shifted while the second RF band 206 remains unshifted.

The first and second RF bands 202, 206 can be offset by edge offset 306. The edge offset 306 can be a difference between the inflections points 211 and 216. The edge offset 306 can be determined to be the minimum offset for which no ripple (or an acceptable amount of ripple) is created as a result of the overlap. An offset 306 may be used to minimize ripple in the overlap zone.

Positioning the first and second RF bands 202, 206 and determining the offset 306 can be performed to limit or avoid gain and/or group delay variations in the overlap zone. For example, an uplink communications path between the remote unit 102 and a mobile communications device can be characterized by placing the first and second RF bands 202, 206 adjacent to each other. The downlink path can be centered on the overlap zone between the first and second RF bands 202, 206. The first and second RF bands 202, 206 can be separated by an offset 306 that is configured to eliminate, minimize, or reduce potential local oscillator leakage which can negatively impact measurement accuracy. According to one aspect, if no signal is located in the center of the combined RF band at the frequency position of 306, the edge offset 306 can be minimized such that the first and second RF bands 202, 206 can be placed next to each other.

As described above, a digital signal processor matching filter can be used to equalize an amplitude and a group delay ripple associated with combining the first and second RF bands. The offset can either be determined at the time of design qualification or interactively on site.

Figure 6:
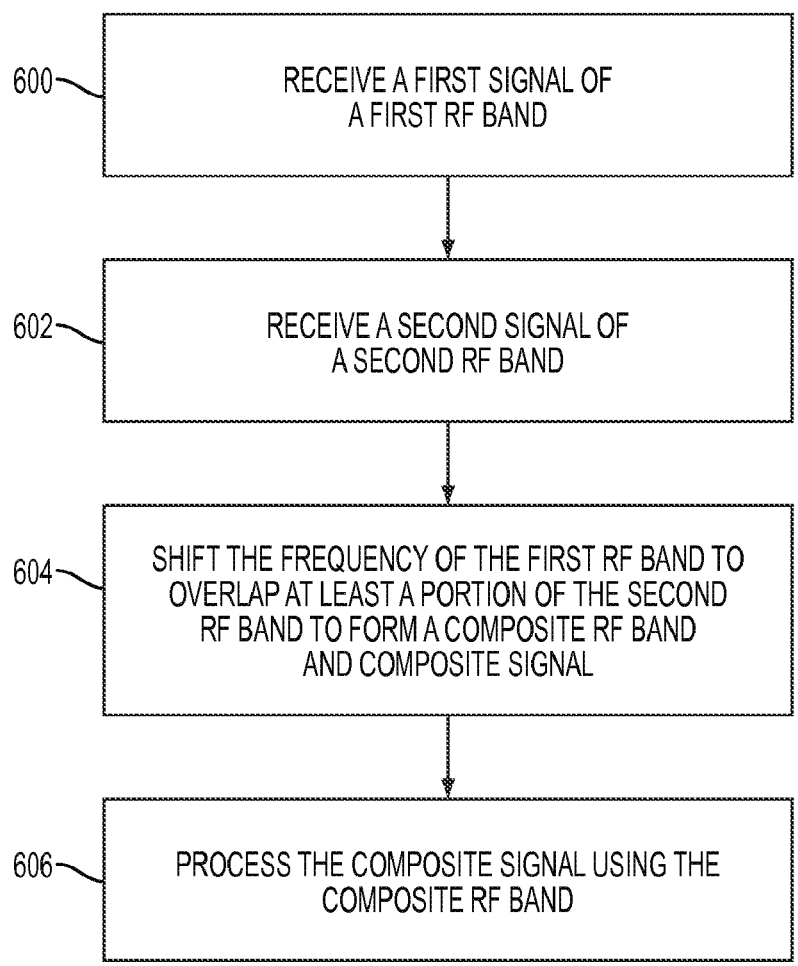
FIG. 6 is a flow chart of a process for combining RF bands according to one aspect of the present disclosure.

FIG. 6 is a flow chart depicting an example of a process for performing RF bandwidth combining according to one aspect of the present disclosure. At block 600, a first signal of a first RF band can be received by a remote unit of a DAS. For example, the first signal 200 associated with the first RF band 202 can be received by the remote unit 102 and provided to the frequency offset device 114.

At block 602, a second signal of a second RF band can be received by the remote unit of the DAS. For example, the second signal 204 associated with the second RF band 206 can also be received by the remote unit 102 and provided to the frequency offset device 114.

At block 604, the frequency of the first RF band can be shifted by a frequency offset device to overlap at least a portion of the second RF band to form a composite RF band and a composite signal. For example, the first RF band 202 can be shifted so that the leading edge 209 overlaps with the trailing edge 213 of the second RF band 206 to form composite RF band 302.

At block 606, the composite signal can be processed using the composite RF band. For example, the composite signal 304 can be processed across the composite band 300.

In some examples, frequency offsetting can be used to process signals between RF bands. If an RF signal centered around a gap between two RF bands is received, one component of the signal may be distributed over slots of the first RF band and another component of the signal may be distributed and processed over a path of the second RF band. When the RF bands are combined at an antenna, a 3 dB increase in power can be provided at the center of RF signal, which would be an amplitude distortion and frequency offsetting the signal can be used to resolve the issue.

The positioning of two RF bands to form a composite RF band with an RF bandwidth less or slightly more than the total RF bandwidth of both RF bands is shown for one RF path direction (for example, the downlink path). The equivalent positioning can be performed for the opposite RF path direction (for example, the uplink path).

Figure 7:
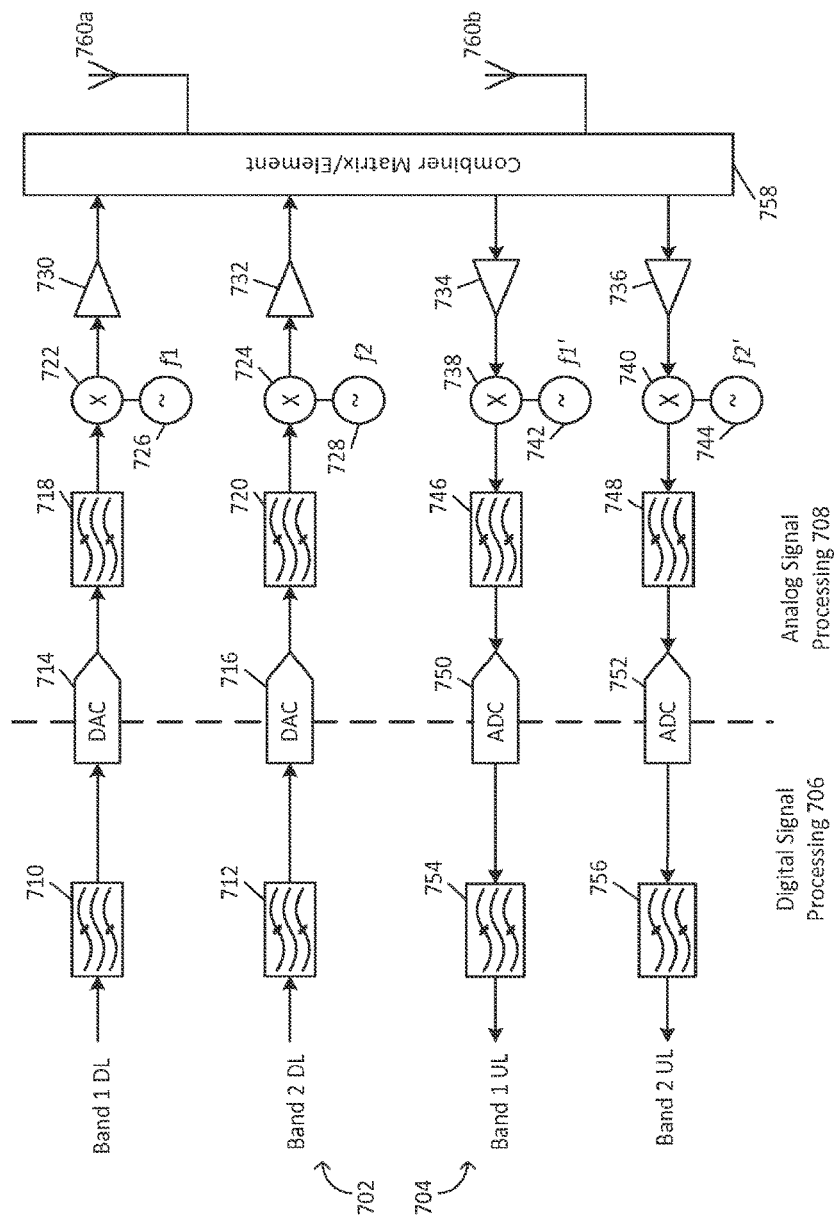
FIG. 7 is a schematic of part of a frequency offset device according to one aspect of the present disclosure.

FIG. 7 depicts an example of circuitry that may be included in a frequency offset devices, such as frequency offset device 114 or frequency offset device 116 in FIG. 1. The frequency offset device can include downlink paths 702 and uplink paths 704, each with a digital signal processing section 706 and an analog signal processing section 708. The downlink paths 702 can include circuitry for processing two different bands of signals (e.g. downlink band 1 and downlink band 2). The circuitry can include digital filters 710, 712, digital-to-analog converters 714, 716, analog filters 718, 720, mixers 722, 724, local oscillators 726, 728, and power amplifiers 730, 732. The uplink paths can include circuitry for processing two different uplink bands of signals (e.g. uplink band 1 and uplink band 2). The circuitry can include low noise amplifiers 734, 736, mixers 738, 740, local oscillators 742, 744, analog filters 746, 748, analog-to-digital converters 750, 752, and digital filters 754, 756. The frequency offset device also includes a combiner matrix or element 758 and one or more antennas 760a-b.

Two downlink bands at different frequency ranges can be received, such as from head-end unit of distributed antenna system, and filtered by digital filters 710, 712. The filtered bands can be converted to analog signals by digital-to-analog converters 714, 716. The analog signals of the bands can be filtered by analog filters 718, 720. Mixers 722, 724 can up-convert the frequencies of the signals to proper radio frequencies based on different oscillator signals (f1 and f2, respectively) from local oscillators 726, 728. For example, one or more of the downlink signals may be frequency shifted for purposes of processing and one or more of the mixers 722, 724 frequency shifts (and up-converts) the downlink signal(s) to remove the frequency shift. The up-converted signals are amplified by power amplifiers 730, 732, combined by the combiner matrix or element 758, and wirelessly transmitted by antenna 760a.

Uplink signals of different bands can be received by antenna 760b. Although two antennas 760a-b are depicted, in other examples only one antenna is used to transmit downlink signals and receive uplink signals. More than two antennas can also be used.

The uplink signals of two (or more) different bands can be processed by the combiner matrix or element 758 or separate the two different bands into two signal paths. Low noise amplifiers 734, 736 can amplify the different bands. At least one of the bands can be frequency shifted by at least one or the mixers 738, 740 according to oscillator signals from local oscillators 742, 744 such that the frequency shifted band overlaps the other band. In addition, both bands can be down-converted to lower frequencies by mixers 738, 740. The signals can be filtered by analog filters 746, 748, converted to digital form by analog-to-digital converters 750, 752, and digitally filtered by digital filters 754, 756 prior to being further processed and transported, together, to a head-end unit.

The foregoing description of the examples, including illustrated examples, of the subject matter has been presented only for the purpose of illustration and description and is not intended to be exhaustive or to limit the subject matter to the precise forms disclosed. Numerous modifications, adaptations, and uses thereof will be apparent to those skilled in the art without departing from the scope of this subject matter. The illustrative examples described above are given to introduce the reader to the general subject matter discussed here and are not intended to limit the scope of the disclosed concepts.

What is claimed is:

1. A method comprising:
   receiving signals of a first RF band and signals of a second RF band at a remote unit of a distributed antenna system;
   positioning in frequency the first RF band to form a composite RF band, the composite RF band having an edge of the first RF band overlapping an edge of the second RF band, the composite RF band including information from the signals of the first RF band and from the signals of the second RF band, the composite RF band including an edge offset; and
   processing the composite RF band at the remote unit.

2. The method of claim 1, wherein positioning in frequency the first RF band to form the composite RF band includes frequency positioning signals of the first RF band.

3. The method of claim 1, wherein positioning in frequency the first RF band to form the composite RF band includes positioning in frequency both the first RF band and the second RF band.

4. The method of claim 1, wherein the composite RF band has a wider bandwidth than a total of the bandwidth of the first RF band and the bandwidth of the second RF band.

5. The method of claim 1, wherein positioning in frequency the first RF band to form the composite RF band includes determining a frequency offset for positioning in frequency the first RF band.

6. The method of claim 5, wherein determining frequency offset includes providing signals in the first RF band and the second RF band and centering the composite RF band between the first RF band and the second RF band.

7. The method of claim 5, wherein determining the frequency offset includes scanning the first RF band and the second RF band using a continuous wave signal, a wideband noise signal, or a quasi-noise signal.

8. The method of claim 5, wherein determining the frequency offset includes determining the frequency offset at design qualification or interactively at an on-site location.

9. The method of claim 1, wherein the first RF band is shifted to form the composite RF band by a frequency offset device in the remote unit.

10. A system comprising:
a remote unit of a distributed antenna system that includes a head-unit unit, the remote unit being configured for receiving signals of a first RF band and signals of a second RF band from a coverage zone; and
a frequency offset device associated with the remote unit, the frequency offset device being configured for positioning in frequency at least one of the first RF band or the second RF band to form a composite RF band having an edge of the first RF band overlapping an edge of the second RF band, the composite RF band including information from the signals of the first RF band and from the signals of the second RF band, the composite RF band including an edge offset;
wherein the remote unit is configured for processing the composite RF band prior to transmitting the composite RF band to the head-end unit.

11. The system of claim 10, wherein the frequency offset device is located in the remote unit.

12. The system of claim 10, wherein the distributed antenna system includes a second remote unit configured for providing wireless coverage in a second coverage zone, the second remote unit being communicatively coupled to the head-end unit.

13. The system of claim 10, wherein the frequency offset device is configured for positioning in frequency at least one of the first RF band or the second RF band to form the composite RF band by frequency shifting signals of the first RF band.

14. The system of claim 10, wherein the frequency offset device is configured for positioning in frequency at least one of the first RF band or the second RF band to form the composite RF band by positioning in frequency both the first RF band and the second RF band.

15. The system of claim 10, wherein the frequency offset device is configured to form the composite RF band such that the composite RF band has a wider bandwidth than a total of the bandwidth of the first RF band and the bandwidth of the second RF band prior to the first RF band or the second RF band being positioned in frequency.

16. The system of claim 10, wherein the frequency offset device is configured for determining a shift amount for positioning in frequency the first RF band.

17. The system of claim 16, wherein the frequency offset device is configured for determining the shift amount by scanning the first RF band and the second RF band using a continuous wave signal, a wideband noise signal, or a quasi-noise signal.

18. A distributed antenna system, comprising:
a head-end unit to transceive signals with a base transceiver station, a first remote unit, and a second remote unit;
the first remote unit positioned for providing wireless coverage for a first coverage zone; and
the second remote unit positioned for providing wireless coverage for a second coverage zone, the second remote unit including circuitry for receiving signals of a first RF band and signals of a second RF band, the second remote unit including a frequency offset device configured for positioning in frequency at least one of the first RF band or the second RF band to form a composite RF band having an edge of the first RF band overlapping an edge of the second RF band, the composite RF band including information from the signals of the first RF band and from the signals of the second RF band, the composite RF band including an edge offset, the second remote unit being configured for processing the composite RF band prior to transmitting the composite RF band to the head-end unit.

19. The distributed antenna system of claim 18, wherein the frequency offset device is configured to form the composite RF band such that the composite RF band has a wider bandwidth than a total of the bandwidth of the first RF band and the bandwidth of the second RF band.

* * * * *